(12) United States Patent
Price et al.

(10) Patent No.: US 11,727,050 B2
(45) Date of Patent: Aug. 15, 2023

(54) PUBLISHER TOOL FOR CONTROLLING SPONSORED CONTENT QUALITY ACROSS MEDIATION PLATFORMS

(71) Applicant: Google LLC, Mountain View, CA (US)

(72) Inventors: Thomas Price, San Fancisco, CA (US); Tuna Toksoz, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 287 days.

(21) Appl. No.: 16/785,317

(22) Filed: Feb. 7, 2020

(65) Prior Publication Data

US 2020/0175296 A1 Jun. 4, 2020

Related U.S. Application Data

(63) Continuation of application No. 15/060,339, filed on Mar. 3, 2016, now Pat. No. 10,572,750.

(51) Int. Cl.
*G06F 16/583* (2019.01)
*G06F 16/958* (2019.01)
(Continued)

(52) U.S. Cl.
CPC .......... *G06F 16/583* (2019.01); *G06F 16/958* (2019.01); *G06F 18/24323* (2023.01); *G06Q 30/0241* (2013.01); *G06V 30/224* (2022.01)

(58) Field of Classification Search
CPC ....... G06K 9/18; G06F 16/583; G06F 16/985; G06Q 30/0241
See application file for complete search history.

(56) References Cited

U.S. PATENT DOCUMENTS 7,971,137 B2 6/2011 Jindal et al.
8,311,889 B1 11/2012 Lagle Ruiz et al.
(Continued)

FOREIGN PATENT DOCUMENTS

WO WO-2011/014857 2/2011

OTHER PUBLICATIONS

Ad Mob Ad Review Center: https://web.archive.org/web/*/https://support.google.com/admob/answer/3480906?hl=en&ref_topic, attached. (Year: 2015).*

(Continued)

*Primary Examiner* — Katherine Kolosowski-Gager
(74) *Attorney, Agent, or Firm* — Marshall, Gerstein & Borun LLP

(57) ABSTRACT

Systems and methods are described for providing an interface and implementing rules and metrics received from the interface regarding the selection of sponsored content networks that provide sponsored content items. This may include providing mediation code to a publisher for inclusion in publisher content provided to a user device, the mediation code associated with a table of sponsored content networks, receiving an image of a sponsored content item and a sponsored content network identifier from the user device, analyzing the image of the sponsored content item, the analysis generating extracted image data from the sponsored content item, categorizing the sponsored content item based on the extracted image data and the sponsored content network identifier, receiving an instruction to filter the sponsored content networks exceeding a metric based on a category, and updating the table of sponsored content networks to remove a particular sponsored content network.

20 Claims, 6 Drawing Sheets

(51) Int. Cl.
*G06V 30/224* (2022.01)
*G06F 18/243* (2023.01)
*G06Q 30/0241* (2023.01)

(56) References Cited

U.S. PATENT DOCUMENTS

| | | | |
|---|---|---|---|
| 8,406,739 B2 | 3/2013 | Hull et al. | |
| 8,472,728 B1 | 6/2013 | Chau et al. | |
| 8,572,639 B2 | 10/2013 | Ficco | |
| 2007/0038351 A1* | 2/2007 | Larschan | G07C 9/37 701/33.4 |
| 2007/0256033 A1* | 11/2007 | Hiler | G06Q 10/10 707/E17.143 |
| 2009/0165140 A1* | 6/2009 | Robinson | G06F 21/10 715/757 |
| 2010/0124907 A1* | 5/2010 | Hull | G06Q 30/0261 455/412.1 |
| 2010/0145762 A1* | 6/2010 | Coladonato | G06Q 30/02 705/14.4 |
| 2010/0153548 A1* | 6/2010 | Wang | G06Q 30/02 709/224 |
| 2010/0332313 A1 | 12/2010 | Miller et al. | |
| 2012/0158525 A1 | 6/2012 | Kae et al. | |
| 2015/0178786 A1 | 6/2015 | Claessens | |
| 2016/0234624 A1 | 8/2016 | Riva et al. | |
| 2017/0193545 A1* | 7/2017 | Zhou | G06Q 30/0254 |

OTHER PUBLICATIONS

"Selenium Training Expert" https://seleniumonlinetrainingexpert.wordpress.com/2012/11/29/how-to-capturing-screenshots-from-selenium-ide/, attached (Year: 2012).*
Son, Sooel, Daehyeok Kim, and Vitaly Shmatikov. "What Mobile Ads Know About Mobile Users." NDSS. 2016.(available at https://www.ndss-symposium.org/wp-content/uploads/2017/09/what-mobile-ads-know-about-mobile-users.pdf) (Year: 2016).*
Kanalley, Craig: Youtube Gives Users Ability to Flag Content that Promotes Terrorism (available at https://www.huffpost.com/entry/youtube-terrorism-flag_n_796128) (Year: 2010).*
First Office Action for CN Appln. Ser. No. 201780004862.3 dated Mar. 2, 2021 (5 pages).
"AdMob Help: About the ad review center", 2015, retrieved Aug. 11, 2018 from URL: https://web.archive.org/web.archive.org/we/20151023153644/https://support.google.com/admob/answer/3480906?hl=en&ref_topic (4 pages).
"AdMob Help: About your AdMob Network report", Oct. 1, 2015, XP55376480, retrieved May 29, 2017 from URL: https://web.archive.org/web/20151001184738/https://support/google.com/admob/answer/6158845?hl=en (3 pages).
"AdMob Help: Block ads by ad network", Oct. 23, 2015, retrieved Aug. 22, 2018 from URL: https://web.archive.org/web/20151023154646/https://support.google.com/admob/answer/6067448 (2 pages).
"Mediation: Publishers Get Started", Sep. 9, 2015, XP55375886, retrieved May 24, 2017 from URL: https://web.archive.org/web/20150909090315/https://developers.google.com/admob/android/mediation (2 pages).
Final Office Action for U.S. Appl. No. 15/060,339 dated Mar. 22, 2019 (16 pages).
International Preliminary Report on Patentability for PCT Appln. Ser. No. PCT/US2017/020517 dated Jun. 6, 2018 (13 pages).
International Search Report and Written Opinion for PCT Appln. Ser. No. PCT/US2017/020517 dated Jul. 6, 2017 (16 pages).
Maken, "Adwords, AdSense, AdMob & DoubleClick: Internet Monetization", Aug. 31, 2014, XP55375870, Retrieved May 24, 2017 from URL: http://www.gametheory.polimi.it/uploads/4/1/4/6/41466579/furthereadings-advertising.pdf (51 pages).
Non-Final Office Action for U.S. Appl. No. 15/060,339 dated Aug. 28, 2018 (16 pages).
Notice of Allowance for U.S. Appl. No. 15/060,339 dated Jan. 15, 2020 (3 pages).
Notice of Allowance for U.S. Appl. No. 15/060,339 dated Oct. 18, 2019 (14 pages).
Son et al., "What Mobile Ads Know About Mobile Users", NDSS '16, Feb. 21-24, 2016, San Diego, California, retrieved from URL: https://www.cs.cornell.edu/~shmat/shmat_ndss16.pdf (14 pages).

* cited by examiner

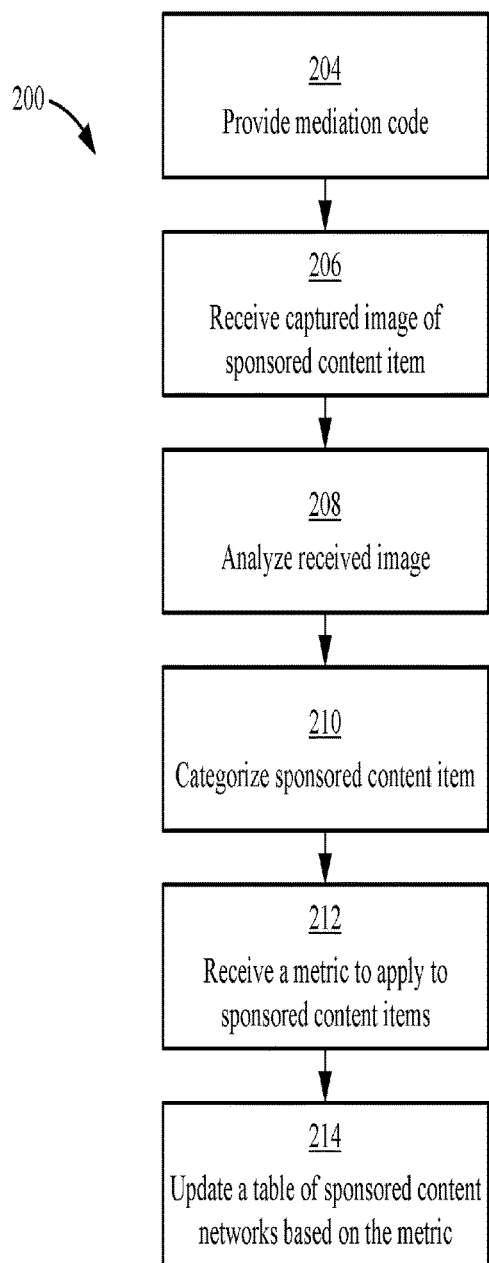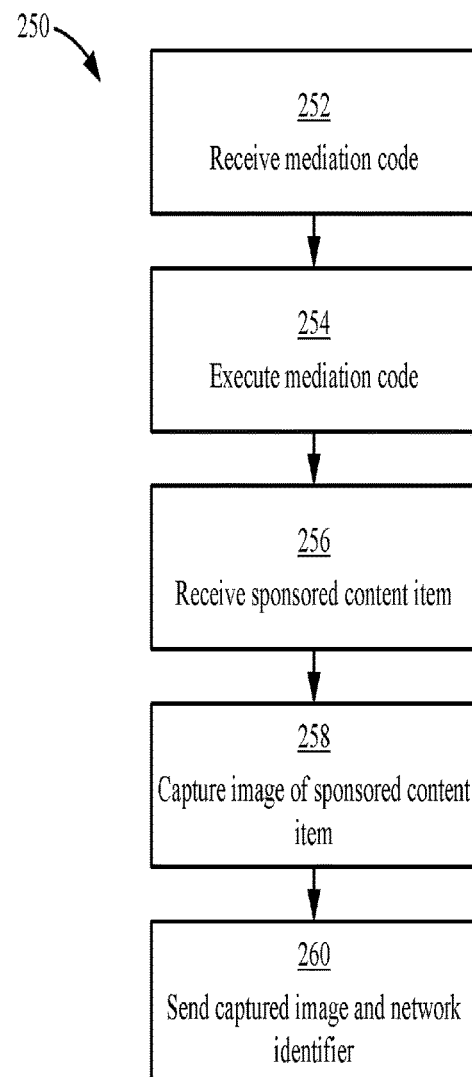
FIG. 2a
FIG. 2b

400

Recent Sponsored Content Items Shown

Show by: Date — 402

404

| ID | Sponsored Content Network | Category | Date | Flagged |
|---|---|---|---|---|
| XXXXX | Network C | Category D | 12/10/2015 | No |
| XXXXX | Network A | Category C | 12/10/2015 | No |
| XXXXX | Network B | Category A | 12/10/2015 | Yes |
| XXXXX | Network A | Category F | 12/11/2015 | No |

FIG. 4

PUBLISHER TOOL FOR CONTROLLING SPONSORED CONTENT QUALITY ACROSS MEDIATION PLATFORMS

CROSS-REFERENCE TO RELATED APPLICATIONS

The present application claims the benefit of and priority to U.S. patent application Ser. No. 15/060,339, entitled "PUBLISHER TOOL FOR CONTROLLING SPONSORED CONTENT QUALITY ACROSS MEDIATION PLATFORMS," filed on Mar. 3, 2016, the contents of which is incorporated herein by reference in its entirety.

BACKGROUND

Publishers may request content from multiple third-party content providers as part of choosing a sponsored content item to display with the publisher content. This is often done through the use of mediation platforms that interact with the third-party content providers. The mediation platform chooses a third-party content provider and then the third party content provider network is responsible for requesting and serving the sponsored content items. Accountability for undesirable sponsored content items may be difficult when many different third-party content provider networks are serving sponsored content items.

SUMMARY

One implementation relates to a method running on one or more processors of a computing device providing mediation code to a publisher for inclusion in publisher content provided to a user device. The mediation code is associated with a table of sponsored content networks. The method further relates to receiving an image of a sponsored content item and a sponsored content network identifier from the user device, analyzing the image of the sponsored content item, the analysis generating extracted image data from the sponsored content item, and categorizing the sponsored content item based on the extracted image data and the sponsored content network identifier. The method further relates to receiving an instruction to filter the sponsored content networks exceeding a metric based on a category, the instruction comprising the metric and associated with the publisher and updating the table of sponsored content networks to remove a particular sponsored content network, the particular sponsored content network exceeding the metric based on the category to prevent serving of sponsored content items from the particular sponsored content network to the user device.

Another implementation relates to a system running on one or more processors of a demonstration system receiving interaction data with a user electronic device. The method may include receiving data over a network comprising an identifier of a model of a user device, an identifier of an application on the user device, and an indication of an interaction with the application and launching one of a video playback, a tutorial, a demonstration, and a simulation responsive to receiving the data. The method may further comprise receiving additional data over the network comprising an identifier of the application, an indication of a response from the application, and an indication of another interaction with the application after the response from the application.

Another implementation relates to a system with at least one processor and memory that is operatively coupled to the processor, wherein the memory stores instructions that are executed by the at least one processor. Execution of the instructions causes the system to provide mediation code to a publisher for inclusion in publisher content provided to a user device, the mediation code associated with a table of sponsored content networks, receive an image of a sponsored content item and a sponsored content network identifier from the user device, analyze the image of the sponsored content item, the analysis generating extracted image data from the sponsored content item, categorize the sponsored content item based on the extracted image data and the sponsored content network identifier, receive an instruction to filter the sponsored content networks exceeding a metric based on a category, the instruction comprising the metric and associated with the publisher, and update the table of sponsored content networks to remove a particular sponsored content network, the particular sponsored content network exceeding the metric based on the category to prevent serving of sponsored content items from the particular sponsored content network to the user device.

Another implementation relates to non-transitory computer-readable storage media storing instructions that are executable by one or more processing devices to perform operations. Performing the operations may comprise providing mediation code to a publisher for inclusion in publisher content provided to a user device, the mediation code associated with a table of sponsored content networks, receiving an image of a sponsored content item and a sponsored content network identifier from the user device, analyzing the image of the sponsored content item, the analysis generating extracted image data from the sponsored content item, categorizing the sponsored content item based on the extracted image data and the sponsored content network identifier, receiving an instruction to filter the sponsored content networks exceeding a metric based on a category, the instruction comprising the metric and associated with the publisher, and updating the table of sponsored content networks to remove a particular sponsored content network, the particular sponsored content network exceeding the metric based on the category to prevent serving of sponsored content items from the particular sponsored content network to the user device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2a is a block diagram depicting an implementation of a method of capturing images of sponsored content items for analysis and categorization.

FIG. 2b, is a block diagram depicting an implementation of a method of executing mediation code to capture and send images of sponsored content items.

FIG. 4 depicts an implementation of a screen of a user interface provided to a publisher to review recent sponsored content items.

DETAILED DESCRIPTION

Following below are more detailed descriptions of various concepts related to, and implementations of, methods, apparatuses, and systems for a publisher tool for controlling sponsored content item quality across mediation platforms. The various concepts introduced above and discussed in greater detail below may be implemented in any of numerous ways, as the described concepts are not limited to any particular manner of implementation. Specific implementations and applications are provided primarily for illustrative purposes.

In some instances, systems and methods are desirable for a mediation platform running text and image analysis on advertisements (or other sponsored content items) being served by other ad networks. The systems and methods allow the user, often a publisher content provider, to flag bad sponsored content items and use a user interface to manage the sponsored content items served. Managing sponsored content items may include turning on or off specific sponsored content items (ads) or even entire networks. Turning off entire networks may be based on metrics regarding unwanted sponsored content items served by the networks. Advertisements may in some instances be flagged for content, including nudity, curse words, etc. The sponsored content items may be uploaded to servers to run classification algorithms to classify and flag the sponsored content items. Alternately, the processing of the image and text can be done on the system running the mediation platform or even on the user device.

For purposes of reading the description of the various implementations below, the following descriptions of the sections of the specification and their respective contents may be helpful:

- Section A describes an environment for a publisher tool for controlling sponsored content item quality across mediation platforms which may be useful for practicing implementations described herein;
- Section B describes implementations of methods for using a publisher tool for controlling sponsored content item quality across mediation platforms.
- Section C describes user interfaces which may be useful for practicing implementations described herein.
- Section D describes a network environment and computing environment which may be useful for practicing implementations described herein.

Figure 1:
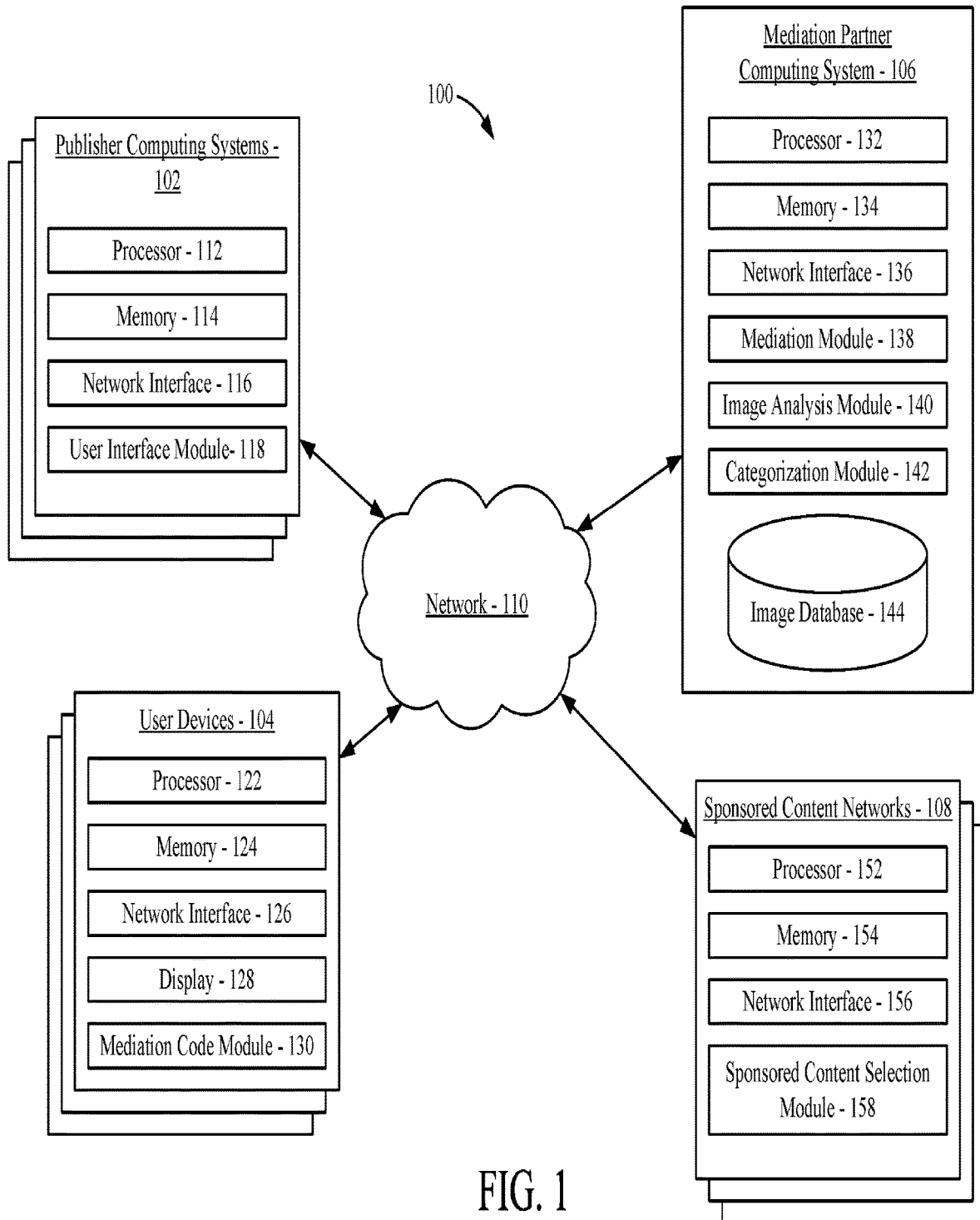
FIG. 1 is a block diagram depicting an implementation of an environment for providing a publisher tool for controlling sponsored content item quality across mediation platforms.

A. Controlling Sponsored Content Item Quality Across Mediation Platforms Environment Prior to discussing the specifics of implementations of the systems and methods of using a publisher tool for controlling sponsored content item quality across mediation platforms, it may be helpful to discuss an implementation of an environment where such systems and methods may be deployed. FIG. 1 depicts one implementation of an environment 100. In brief overview, the environment comprises user devices 104, communicating over a network 110 to publisher computing systems 102 and sponsored content networks 108. A mediation partner computing system 106 communicates over the network 110 to publisher computing systems 102 as well as the user devices 104. The electronic user devices 104 may be any number of different types of personal and mobile devices configured to communicate via the network 110 (e.g., a laptop computer, a tablet computer, a smartphone, a digital video recorder, a set-top box for a television, a video game console, combinations thereof, etc.).

The network 110 may be any form of computer network that relays information between the publisher computing systems 102, the user devices 104, the mediation partner computing system 106 and the sponsored content networks 108. In other arrangements, the network 110 may include the Internet and/or other types of data networks, such as a local area network (LAN), a wide area network (WAN), a cellular network, satellite network, or other types of data networks. The network 110 may also include any number of additional computing devices (e.g., computer, servers, routers, network switches, smartphones, tablets, mobile phones, etc.) that are configured to receive and/or transmit data within the network 110. These devices may aid connection to the network and may further use wireless communication methods such as a BLUETOOTH transceiver, a BLUETOOTH beacon, an RFID transceiver, Near Field Communication (NFC) transmitter or other similar technologies known in the art. The network 110 may further include any number of hardwired and/or wireless connections. For example, the user devices 104 may communicate wirelessly (e.g., via WI-FI, cellular, radio, etc.) with a transceiver that is hardwired (e.g., via a fiber optic cable, a CAT5 cable, etc.) to other computing devices for communication over the network 110 to communicate with the publisher computing systems 102. In some arrangements, reliable communication methods are used over the network with acknowledgment and resend if there is no acknowledgment received.

Still referring to FIG. 1, the one or more publisher computing systems 102 as depicted include a processor 112, a memory 114, a network interface 116, and a user interface 118. The memory 114 may store machine instructions that, when executed by the processor 112, cause the processor 112 to perform one or more of the operations described herein. The processor 112 may include one or more microprocessors, application specific integrated circuits (ASICs), field programmable gate arrays (FPGAs), other forms of processing circuits, or combinations thereof. The memory 114 may include, but is not limited to, electronic, optical, magnetic, or any other storage or transmission device capable of providing the processor 112 with program instructions. The memory 114 may include storage devices such as a floppy disk, CD-ROM, DVD, magnetic disk, memory chip, ROM, RAM, EEPROM, EPROM, flash memory, optical media, or any other suitable memory from which the processor 112 can read instructions. The processor 112 and the memory 114 may form a processing module. The memory 114 may include files to run an operating system and a user interface module 118. In some arrangements, publisher computing systems 102 are servers that are associated with a publisher and compile and host data associated with the publisher to be displayed on user devices 104 accessing the publisher content via the network 110. The publisher data may be combined for display with sponsored content items obtained from one or more sponsored content networks 108 via the network 110. The publisher data may be combined for display with the sponsored content items at the user devices 104 without the sponsored content item ever being sent to or stored on the publisher computing system 102. In other arrangements, the publisher computing systems 102 are any computing device associated with a publisher used to interact with a mediation partner computing system 106 for setting filters and rules for the selection of sponsored content networks 108 when a sponsored content network is requested by a user device 104 for display with content associated with the publisher.

The publisher computing systems 102 are shown to include a network interface 116. In some arrangements, the network interface 116 is a hardware interface allowing data to pass to and from the network 110 (e.g., the internet). In some arrangements, the network interface 116 includes the hardware and logic necessary to communicate over multiple channels of data communication. For example, the network interface 116 may include an Ethernet transceiver, a cellular modem, a BLUETOOTH transceiver, a BLUETOOTH beacon, an RFID transceiver, and/or an NFC transmitter. Data passing through the network interface 116 may be encrypted such that the network interface 116 is a secure communication module.

The publisher computing systems 102 are shown to include a user interface module 118. In some arrangements, the user interface module 118 has been provided by the mediation partner computing system 106. The user interface module 118 may interact with a user of the publisher computing system 102 through a web browser interface. In other arrangements, the user interface module 118 may be an application or other piece of software running on the publisher computing system 102 communicating to a mediation partner computing system 106 through an application program interface (API). In some arrangements, the user interface module 118 is configured to accept input from a user associated with a publisher to set filters and rules for the selection of sponsored content networks 108 when a sponsored content item is requested by a user device 104 for display with content associated with the publisher.

The user devices 104 as depicted include a processor 122 and a memory 124. The memory 124 may store machine instructions that, when executed by the processor 122, cause the processor 122 to perform one or more of the operations described herein. The processor 122 may include one or more microprocessors, application specific integrated circuits (ASICs), field programmable gate arrays (FPGAs), other forms of processing circuits, or combinations thereof. The memory 124 may include, but is not limited to, electronic, optical, magnetic, or any other storage or transmission device capable of providing the processor 122 with program instructions. The memory 124 may include storage devices such as a floppy disk, CD-ROM, DVD, magnetic disk, memory chip, ROM, RAM, EEPROM, EPROM, flash memory, optical media, or any other suitable memory from which the processor 122 can read instructions. The processor 122 and the memory 124 may form a processing module. The memory 124 may include files to run an operating system and a mediation code module 130.

The user devices 104 are shown to include a network interface 126. In some arrangements, the network interface 126 is a hardware interface allowing data to pass to and from the network 110 (e.g., the internet). In some arrangements, the network interface 126 includes the hardware and logic necessary to communicate over multiple channels of data communication. For example, the network interface 126 may include an Ethernet transceiver, a cellular modem, a BLUETOOTH transceiver, a BLUETOOTH beacon, an RFID transceiver, and/or an NFC transmitter. Data passing through the network interface 126 may be encrypted such that the network interface 126 is a secure communication module.

The user devices 104 include a display 128. In some arrangements, the display 128 is combined with a user input device in the form of a touchscreen device. The display may be any electronic device that conveys data to a user by generating sensory information (e.g., a visualization, sounds, etc.). The display 128 may be internal to the housing of the user device 104 (e.g., a built-in display) or external to the housing of the user device 104 (e.g., a monitor connected to the user device 104), according to various implementations. For example, the user device 104 may include a display 128, which may display webpages, user interfaces for applications, and/or other visual sources of information. In various implementations, the display 128 may be located inside or outside of the same housing as that of the processor 122 and/or the memory 124. For example, the display 128 may be an external display, such as a computer monitor, television set, or any other stand-alone form of electronic display. In other examples, the display 128 may be integrated into the housing of a laptop computer, mobile device, smartphone, tablet, or other form of computing device having an integrated display.

In some arrangements, the display 128 and user input devices are combined in the form of a touchscreen device. The display 128 may be any electronic device that conveys data to a user by generating sensory information (e.g., a visualization, sounds, etc.). The input/output of a user device 104 (not shown) may be any electronic device that converts received information from a user into electronic signals (e.g., a keyboard, a mouse, a pointing device, a touch screen display, a microphone, etc.).

The user devices 104 are shown to include a mediation code module 130. In some arrangements, the mediation code module 130 has been transmitted from a publisher computing system 102 via the network 110 along with publisher content for display on the user device 104. In other arrangements, the mediation code module 130 has been obtained from a mediation partner computing system 106 via the network 110. In some arrangements, the mediation code module 130 is configured to choose from a selection of sponsored content networks 108 from which to request a sponsored content item for display on the user device 104. The sponsored content networks 108 may be accessible by the mediation code module 130 in the form of a table or list in the memory 124. In some arrangements, the mediation code module 130 is received by the user device 104 with a pre-ordered or pre-ranked list of sponsored content networks 108 for use when selecting a sponsored content item. The mediation code module 130 may request a sponsored content item from the first sponsored content network 108 in the list and if unsuccessful, try the next sponsored content network. In some other arrangements, the mediation code module 130 selects the order or priority of sponsored content networks 108 to request a sponsored content item and if unsuccessful in a request from one sponsored content network 108, attempts to request a sponsored content item from a sponsored content network 108 that follows in the order. In some arrangements, the mediation code module 130 is configured to receive a list of banned or blacklisted sponsored content items with the mediation code and when the a sponsored content item is served to the user device 104 that matches the list, reject the served sponsored content item and request another.

In some arrangements, the mediation code module 130 is configured to allow the user of a user device 104 to flag or report a sponsored content item. Flagging or reporting a sponsored content item may also provide a mechanism of describing the reason for flagging or reporting the item (e.g., pull down menu of reasons for reporting, text box to write a reason for flagging or reporting, etc.) In some arrangements, the mediation code module 130 is configured to captured images or screenshots of requested sponsored content items. The captured image may be a screenshot of a sponsored content item displayed on a display of the user device 104 or a screenshot of a full screen of the image displayed also containing the sponsored content item. Therefore, the screenshot of the sponsored content item is captured after a sponsored content item has been requested by the mediation code module 130 from a sponsored content network 108 and received via the network 110. In some arrangements, the captured image is a reconstruction from web data (e.g., html5 data). In some arrangements, the mediation code module 130 is configured to send other data with the captured image data. The other data may include one or more of the associated publisher (e.g., publisher ID), an associated sponsored content network 108 (e.g., sponsored content network ID, time and date requested or received at a user device 104, time and date displayed at a user device 104), flagged status of the sponsored content item by a user, feedback accompanying flagged status, and the like.

The mediation partner computing system 106 as depicted include a processor 132, a memory 134, and a network interface 136. The memory 134 may store machine instructions that, when executed by the processor 132, cause the processor 132 to perform one or more of the operations described herein. The processor 132 may include one or more microprocessors, application specific integrated circuits (ASICs), field programmable gate arrays (FPGAs), other forms of processing circuits, or combinations thereof. The memory 134 may include, but is not limited to, electronic, optical, magnetic, or any other storage or transmission device capable of providing the processor 132 with program instructions. The memory 134 may include storage devices such as a floppy disk, CD-ROM, DVD, magnetic disk, memory chip, ROM, RAM, EEPROM, EPROM, flash memory, optical media, or any other suitable memory from which the processor 132 can read instructions. The processor 132 and the memory 134 may form a processing module. The memory 134 may include files to run an operating system, a mediation module 138, an image analysis module 140, and a categorization module 142.

The mediation partner computing system 106 is shown to include a network interface 136. In some arrangements, the network interface 136 is a hardware interface allowing data to pass to and from the network 110 (e.g., the internet). In some arrangements, the network interface 136 includes the hardware and logic necessary to communicate over multiple channels of data communication. For example, the network interface 136 may include an Ethernet transceiver, a cellular modem, a BLUETOOTH transceiver, a BLUETOOTH beacon, an RFID transceiver, and/or an NFC transmitter. Data passing through the network interface 136 may be encrypted such that the network interface 136 is a secure communication module.

The mediation partner computing system 106 is shown to include a mediation module 138. In some arrangements, the mediation module 138 is configured to communicate with publisher computing systems 102 and user devices 104. Communication with publisher computing systems 102 may include receiving filter settings, rules, or configuration settings related to a publisher concerning mediation of sponsored content items shown with the publisher content. In such arrangements, the mediation module 138 applies the settings, rules, and/or configuration settings to mediation code associated with the publisher in order to give the publisher more control over the selection of sponsored content networks 108 that may be selected when sponsored content items are requested by user devices 104. In some arrangements, applying settings, rules and/or configuration settings to mediation code involves modifying a table or list of available sponsored content networks 108 that is sent with the mediation code. In some arrangements, the mediation module 138 is configured to communicate with publisher computing systems 102 to provide the mediation code that is provided with the publisher content. In other arrangements, the mediation module 138 is configured to communicate directly with a user device 104 to provide the mediation code to the user device 104 for execution while the publisher content is being displayed.

In some arrangements, the mediation module 138 is configured to apply the settings, rules, and/or configuration settings to mediation code associated with the publisher in order to give the publisher more control over the selection of particular sponsored content items served by sponsored content networks 108 to user devices 104. If the publisher applies a rule to disallow or block a particular sponsored content item (i.e., blacklisting a particular sponsored content item), then the mediation partner attempts to prevent the sponsored content item from being shown on user devices 104 showing content from the publisher regardless of the identity of the sponsored content network 108 serving the sponsored content item. In some arrangements, the mediation module 138 is configured to contain a list of disallowed sponsored content items. Individual sponsored content items may be identified by a hash of the image content of the sponsored content item, by the destination URL associated with the sponsored item, or by other unique criteria identifiable in the sponsored content item. In some arrangements, the mediation module 138 is configured to send the list of disallowed sponsored content items to the user device 104 with the mediation code and when the a sponsored content item is served to the user device 104 that matches the list, the mediation code module 130 executing on the user device 104 rejects the served sponsored content item and requests another.

The mediation partner computing system 106 is shown to include an image analysis module 140. In some arrangements, the image analysis module 140 is configured to receive images captured as screenshots from user devices 104 and then analyze the images. Received images and associated data may be stored in the image database 144. Associated data may include an associated publisher, an associated sponsored content network 108, time and date received at a user device 104, sponsored content identifier (ID), and the like. In some arrangements, the image analysis module 140 is configured to analyze images using optical character recognition (OCR). The OCR may be able to recognize a large variety of character sets and languages, including left-to-right, right-to-left, and vertically written languages. The OCR may use image normalization, feature extraction, and/or pattern classification using neural networks, support vector machines, or the like. Feature extraction may include detecting maximally stable external regions, the removal of non-text regions based on geometric properties, and/or the removal of non-text regions based on stroke width variation. Finally, individual text characters detected may be merged into words and/or text lines. In some arrangements, the image analysis module 140 is configured to analyze images or further analyze images using object extraction to extract recognizable objects within the image. The object extraction may use various edge detection, corner detection, blob detection, and ridge detection techniques to facilitate the extraction. In some arrangements, template matching is used to match extracted objects from the image to template images. The template images for matching may be stored in a database (e.g., the image database 144). In some arrangements, other feature detectors may be used including the Kadir-Brady saliency detector, Multi-scale Harris detector, difference of Gaussians, and the like.

The mediation partner computing system 106 is shown to include a categorization module 142. In some arrangements, the categorization module 142 is configured to categorize images that have been received captured as screenshots from user devices 104 and analyzed in the image analysis module 140. The categorization module may utilize both text extracted using OCR methods as well as extracted objects or features matched to template images to categorize the image. In some arrangements, the categorization module 142 utilizes classifiers trained with category names and/or descriptions. In some arrangements, probabilistic latent semantic analysis may be used. In other arrangements, extracted features are encoded as scale-invariant feature transform descriptors. In some arrangements, categorization may separate a detected background image from various features detected in the image and weight the background differently when determining one or more categories to ascribe to the image.

The mediation partner computing system may also include an image database 144. The image database 144 may include files stored in non-volatile memory including files needed to run a mediation module 138, an image analysis module 140, and a categorization module 142. The image analysis module 140 may use the image database 144, in some arrangements, to store template images used for matching extracted features as well as storing any extracted features as images. The categorization module 142 may store received images in the image database 144 prior to or after categorization of the image. Categorization data, sponsored content network 108 data associated with the received image, data regarding flagging of the image by users, and other data received associated with the received image may be associated with the image in the image database 144.

In some arrangements, one or more of the image analysis or categorization (e.g., the image analysis module 140 and categorization module 142) may be done on a separate computer system than the mediation partner computing system 106 with the results of the image analysis and categorization sent to the mediation partner computing system 106. Various modules as depicted in the mediation partner computing system 106 may be done on other computing systems and servers and are not limited to the implementation as depicted. In some arrangements, the mediation code module 130 may be on the mediation partner computing system 106 or other computing system other than the user device 104 (e.g., in a server side mediation implementation). In such an arrangement, the image analysis and categorization may be done prior to the serving of the sponsored content item to a user device 104 and a 'prefiltering' of the sponsored content items can be accomplished using metrics set by the publisher. Pre-filtering may also be done for blacklisted sponsored content items served by any sponsored content network 104, with the sponsored content items identified by a hash of the image content of the sponsored content item, by the destination URL associated with the sponsored item, or by other unique criteria identifiable in the sponsored content item. In some arrangements, the mediation partner computing system 106 may be configured to receive additional information associated with a sponsored content item ID from a publisher computing system 102 including click through rates, conversion rates, impressions, and the like, associated with the sponsored content item and the publisher and/or click through rates, conversion rates, impressions, and total revenue associated with a sponsored content network 108 and the publisher.

Still referring to FIG. 1, the sponsored content networks 108 as depicted include a processor 152, a memory 154, and a network interface 156. The memory 154 may store machine instructions that, when executed by the processor 152, cause the processor 152 to perform one or more of the operations described herein. The processor 152 may include one or more microprocessors, application specific integrated circuits (ASICs), field programmable gate arrays (FPGAs), other forms of processing circuits, or combinations thereof. The memory 154 may include, but is not limited to, electronic, optical, magnetic, or any other storage or transmission device capable of providing the processor 152 with program instructions. The memory 154 may include storage devices such as a floppy disk, CD-ROM, DVD, magnetic disk, memory chip, ROM, RAM, EEPROM, EPROM, flash memory, optical media, or any other suitable memory from which the processor 152 can read instructions. The processor 152 and the memory 154 may form a processing module. The memory 154 may include files to run an operating system and a sponsored content selection module 158.

The sponsored content networks 108 are shown to include a network interface 156. In some arrangements, the network interface 156 is a hardware interface allowing data to pass to and from the network 110 (e.g., the internet). In some arrangements, the network interface 156 includes the hardware and logic necessary to communicate over multiple channels of data communication. For example, the network interface 156 may include an Ethernet transceiver, a cellular modem, a BLUETOOTH transceiver, a BLUETOOTH beacon, an RFID transceiver, and/or an NFC transmitter. Data passing through the network interface 156 may be encrypted such that the network interface 156 is a secure communication module.

The sponsored content networks 108 are shown to include a sponsored content selection module 158. In some arrangements, the sponsored content selection module 158 is configured to communicate with user devices 104. Configuration for communication with user devices 104 may include being configured to receive sponsored content requests from mediation code modules 130 executing on the user devices 104. In some arrangements, additional data accompanies or is contained in the request regarding type of sponsored content, format, category, and/or display requirements of the requesting user device 104. The sponsored content selection module 158 is configured to select a sponsored content item to satisfy the request and transmit the selected sponsored content item via the network 110 to the requesting user device 104.

B. Methods for Controlling Sponsored Content Item Quality Across Mediation Platforms Referring now to FIG. 2a, a block diagram of a method 200 of capturing images of sponsored content items for analysis and categorization is depicted according to an implementation. In some arrangements, the method 200 is performed by a processor 132 running instructions from a memory 134 on a mediation partner computing system 106. While performing the method 200, the mediation partner computing system 106 communicates data over a network interface 136 over a network 110 to a network interface 126 of a user device 104 and/or to a network interface 116 of a publisher computing system 102. In brief overview of method 200, the method 200 includes the steps of providing mediation code, receiving captured image of a sponsored content item, analyzing the received image, categorizing the sponsored content item, receiving a metric to apply to sponsored content items, and updating a table of sponsored content networks 108 based on the metric.

Still referring to FIG. 2a and in more detail, the method 200 begins when mediation code is provided at 204. In some arrangements, a module of the mediation partner computing system 106 provides mediation code to a computing device which may be a publisher computing system 102. The mediation code is then provided to a user device 104 via the publisher computing system 102 along with publisher content. The mediation code may be a client-side script embedded within an HTML or XHTML document or contained in a separate file as an external script. In some arrangements, part or all of the mediation code stays on the server as a server-side script and executed when the user device 104 displaying publisher content requests a document.

A captured image of a sponsored content item is received at 206. In some arrangements, the captured image is sent by the user device 104 responsive to execution of the mediation code. The captured image may be a screenshot of a sponsored content item displayed on a display of the user device 104 or a screenshot of a full screen of the image displayed also containing the sponsored content item. Therefore, the screenshot of the sponsored content item is captured after a sponsored content item has been requested from a sponsored content network 108 and received via the network 110. In some arrangements, the captured image is a reconstruction from web data (e.g., html5 data). In some arrangements, other data is sent with the captured image data, creating captured image data. The other data may include one or more of the associated publisher (e.g., publisher ID), an associated sponsored content network 108 (e.g., sponsored content network ID, time and date requested or received at a user device 104, time and date displayed at a user device 104), and the like.

The received image is analyzed at 208. In some arrangements, the received image is analyzed by the user device 104. In some arrangements, the analysis comprises optical character recognition (OCR) analysis of the image to extract textual elements from the image. The OCR may be able to recognize a large variety of character sets and languages, including left-to-right, right-to-left, and vertically written languages. The OCR may use image normalization, feature extraction, and/or pattern classification using neural networks, support vector machines, or the like. Feature extraction may include detecting maximally stable external regions, the removal of non-text regions based on geometric properties, the removal of non-text regions based on stroke width variation. Finally, individual text characters detected may be merged into words and/or text lines. In some arrangements, the analysis comprises analyzing images or further analyzing images using object extraction or feature extraction to extract recognizable objects or features within the image. The object extraction may use various edge detection, corner detection, blob detection, and ridge detection techniques to facilitate the extraction. In some arrangements, template matching is used to match extracted objects from the image to template images. The template images for matching may be stored in a database (e.g., the image database 144). In some arrangements, other feature detectors may be used including the Kadir-Brady saliency detector, Multi-scale Harris detector, difference of Gaussians, and the like.

The sponsored content item, captured in the received image, is categorized at 210. In some arrangements, categorization is based on data extracted from the received image at 208. Categories may include 'nudity,' 'cursing,' 'high contrast,' 'appropriate for certain age ranges,' and the like. Other categorizations are possible such as 'low revenue,' 'low click through rate,' 'low conversion rate,' and the like. More than one category can be applied to a received image and/or related sponsored content item. Categorization may utilize both text extracted using OCR methods as well as extracted objects or features matched to template images to categorize the image. In some arrangements, classifiers are used that have been trained with category names and/or descriptions. In some arrangements, probabilistic latent semantic analysis may be used. In other arrangements, extracted features are encoded as scale-invariant feature transform descriptors. In some arrangements, categorization may separate a detected background image from various features detected in the image and weight the background differently when determining one or more categories to ascribe to the image.

A metric to apply to sponsored content items is received at 212. In some arrangements, the metric is received from a publisher computing system 102. In some arrangements, the metric is associated with a rule applied to an individual sponsored content item associated with a sponsored content network 108. For example, the rule may be to not use a specific sponsored content item, the specific sponsored content item associated with a sponsored content network 108. In another example, the rule may be to not use a specific sponsored content item regardless of the sponsored content network 108 that served the sponsored content item. In another example, the rule may be to not use a specific content network 108 that provided a particular sponsored content item that has been displayed on user devices 104.

In other arrangements, the metric provided is associated with a rule in reference to a particular sponsored content network 108. For example, the metric and rule may be to no longer request sponsored content items from the particular sponsored content network 108. The metric provided may be used to filter out entire sponsored content networks 108 from being used when sponsored content items are requested. For example, a metric may be received to not use any sponsored content networks 108 where more than 10% of the sponsored content items have been flagged by users. In another example, a metric may be received to not use any sponsored content networks 108 where more than 20% of the sponsored content items have been determined to contain content of a particular (e.g., profane) nature based on image analysis of captured images of the sponsored content items. Metrics may be applied to data concerning the sponsored content items and associated sponsored content networks 108. Metrics may include flagging of items, categories of sponsored content items based on image analysis, undesirable elements in displayed text or images of the sponsored content items regardless of category, revenue of sponsored content networks 108, click through rates of sponsored content networks 108, conversion rates of sponsored content network 108, and the like.

A table or list of sponsored content networks 108 is updated based on the metric at 214. In some arrangements, the table or list is only updated when application of the metric results in one or more specific sponsored content networks 108 being excluded from requests for sponsored content items. In some arrangements, the table or list or the contents of the table or list are included in the mediation code provided at 204 and the absence of a sponsored content network 108 from the table or list results in no requests for sponsored content items sent to sponsored content networks 108 not included on the table or list. The table or list may be associated with the publisher sending the metric. Using the examples above, a metric may be received to not use any sponsored content networks 108 where more than 10% of the sponsored content items have been flagged by users. Application of the rule and metric involves determining the sponsored content networks 108 where more than 10% of the sponsored content items have been flagged by users, removing those sponsored content networks 108 from the list in the provided mediation code associated with the publisher providing the metric and providing the mediation code again with the updated list. In another example, a metric may be received to not use any sponsored content networks 108 where more than 20% of the sponsored content items have been determined to contain content of a particular nature based on image analysis of captured images of the sponsored content items. Application of the rule and metric involves determining the sponsored content networks 108 where more than 20% of the sponsored content items have been determined to contain content of a particular nature based on image analysis and removing those sponsored content networks 108 from the list associated with the publisher setting the metric.

In some arrangements, the metric may be to disallow or block a particular sponsored content item (i.e., blacklisting a particular sponsored content item), then the mediation partner attempts to prevent the sponsored content item from being shown on user devices 104 showing content from the publisher regardless of the identity of the sponsored content network 108 serving the sponsored content item. In some arrangements, a list of disallowed sponsored content items is created or updated and sent with the mediation code to be blocked on the user device 104 in a client implementation. In other arrangements, the list of disallowed or blocked sponsored content items is used on a server (e.g., the mediation partner computing system 106) to filter out blocked sponsored content items in a server side implementation. Individual sponsored content items may be identified by a hash of the image content of the sponsored content item, by the destination URL associated with the sponsored item, or by other unique criteria identifiable in the sponsored content item.

Referring now to FIG. 2b, a block diagram of a method 250 of executing mediation code to capture and send images of sponsored content items is depicted according to an implementation. In some arrangements, the method 250 is performed by a processor 122 running instructions from a memory 124 of a user device 104. While performing the method 250, the user device 104 communicates data over a network interface 126 over the network 110 to a network interface 156 of a sponsored content network 108, the network interface 116 of the publisher computing system 102, and the network interface 136 of the mediation partner computing system 106. In brief overview of method 250, the method 250 includes the steps of receiving mediation code, executing the mediation code, receiving a sponsored content item, capturing an image of the sponsored content item and sending the captured image and a network identifier.

Still referring to FIG. 2b and in more detail, mediation code is received at 252. In some arrangements, the mediation code is received by a user device 104. In some arrangements, the mediation code is provided as part of publisher content by a publisher after a mediation partner computing system 106 has provided the mediation code to a publisher computing system 102 via the network 110. The mediation code may be a client-side script embedded within an HTML or XHTML document or contained in a separate file as an external script. In some arrangements, part or all of the mediation code stays on the server as a server-side script and executed when the user device 104 displaying publisher content requests a document.

The mediation code is executed at 254. In some arrangements, the mediation code is executed by a processor of the user device 104 running a web browser. Execution of the mediation code determines the sponsored content network 108 from which a sponsored content item is requested. In some arrangements, a list or table of available sponsored content networks 108 is used to request a sponsored content item for display. The list or table may be ordered or ranked and upon failure to receive a sponsored content item from a sponsored content network 108, the next sponsored content network 108 on the list or table is used. In some arrangements, execution of the mediation code determines which sponsored content network 108 is sent the request. Factors used in determination may include, the publisher content with which the sponsored content item will be displayed, sponsored content slot size or location, location of the user device 104, a type of device associated with the user device 104, and other factors.

A sponsored content item is received at 256. In some arrangements, the sponsored content item is received by the user device 104 running the mediation code. In some arrangements, the sponsored content item is an image (static or animated). Other sponsored content item formats are possible such as text, videos, widgets, interactive items (e.g., Flash format), and the like. In some arrangements, the received sponsored content item may be compared to a list of disallowed sponsored content items. Individual sponsored content items may be identified by a hash of the image content of the sponsored content item, by the destination URL associated with the sponsored item, or by other unique criteria identifiable in the sponsored content item. If the sponsored content item is identified as being on the disallowed list, the sponsored content item is rejected and a new sponsored content item is requested from the same sponsored content network 108 or a different sponsored content network 108.

An image of the sponsored content item is captured at 258. In some arrangements, the captured image is a screenshot of the displayed screen on the user device 104 displaying the sponsored content item. In other arrangements, the image is obtained from the received data associated with the received sponsored content item (e.g., image obtained from received html5). In some arrangements, sampling of the captured image is also done and only a portion of the captured image is stored to be sent. This may also include only capturing a portion of the displayed screen on the user device.

The captured image as well as a sponsored network identifier is sent as part of captured image data consequent to receiving a sponsored content item and capturing the image of the sponsored content item at 260. In some arrangements, the captured image data is sent by the user device 104 to a mediation partner computing system 106. In some arrangements other data is included in the captured image data such as one or more of the associated publisher (e.g., publisher ID), an associated sponsored content network 108 (e.g., sponsored content network ID, time and date requested or received at a user device 104, time and date displayed at a user device 104), flagged status of the sponsored content item, and the like. The captured image or captured image data may not be sent immediately after receiving a sponsored content item and capturing the image. It may be sent later at a more ideal time. A determination of an ideal time to send a captured image and/or captured image data may include a period of low processor activity of the user device 104, a period of low network activity of the user device 104, accumulation or batching of a plurality of captured images and/or captured image data to send all at once, a predetermined time of day, and the like. In some arrangements, sampling of the captured image is first done and only a portion of the captured image is sent.

Figure 3:
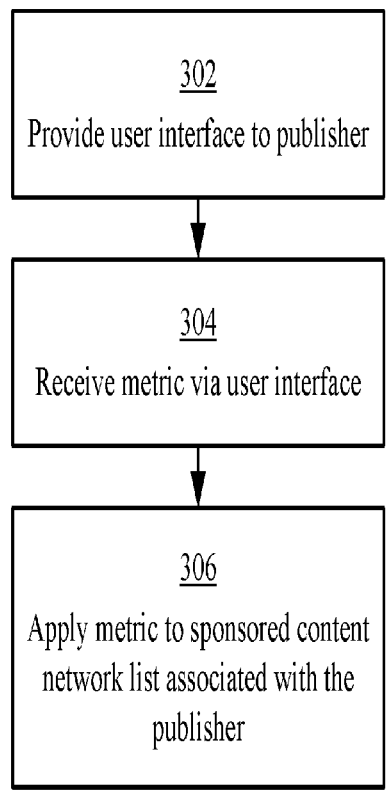
FIG. 3 is a block diagram depicting an implementation of a method of receiving information via a user interface provided to a publisher.

Referring now to FIG. 3, a block diagram of a method 300 for receiving information via a user interface provided to a publisher is depicted. In some arrangements, the method 300 is performed by a processor 132 running instructions from a memory 134 on a mediation partner computing system 106. While performing the method 300, the mediation partner computing system 106 communicates data over a network interface 136 over a network 110 to a network interface 116 of a publisher computing system 102. In brief overview of method 300, the method 200 includes the steps of providing a user interface to a publisher, receiving a metric via the user interface, and applying the metric to a sponsored content network list associated with the publisher.

Still referring to FIG. 3 and in more detail, the method 300 begins when a mediation module of the mediation partner computing system 106 provides a user interface to a computing device at 302. In some arrangements, the user interface is provided to a publisher computing system 102 or a computing system associated with the publisher computing system 102. The user interface may be provided through a web browser displayed interface. In other arrangements, user interface may be an independent application, plugin, or other piece of software running on the publisher computing system 102 communicating to a mediation partner computing system 106 through an application program interface (API). In some arrangements, the user interface accepts input from a user associated with a publisher to set filters and rules for the selection of sponsored content networks 108 when a sponsored content item is requested by a user device 104 for display with content associated with the publisher. In some arrangements, the user interface provides access to data stored on the mediation partner computing system 106. Such information may include data of sponsored content items displayed with content provided by the publisher on user devices 104. The data may include individual sponsored content items displayed (e.g., sponsored content item IDs or images of the sponsored content items), flagged sponsored content items by users, statistics of flagged or reported sponsored content items, and the like.

A metric is received via the user interface at 304. In some arrangements, the metric is associated with a rule applied to an individual sponsored content item associated with a sponsored content network 108. For example, the rule may be to not use a specific sponsored content item chosen from a list, the specific sponsored content item associated with a sponsored content network 108, when the mediation is server side. In another example, the rule may be to not use a specific sponsored content item chosen from a list, regardless of the sponsored content network 108 serving the sponsored content item. In another example, the rule may be to not use a specific content network 108 that provided a sponsored content item selected from a list of sponsored content items that have been displayed on user devices 104. In other arrangements, the metric provided is used to filter out, and no longer use, sponsored content networks 108 depending on the rule and metric provided. For example, a metric may be received to not use any sponsored content networks 108 where more than 10% of the sponsored content items have been flagged by users regardless of reason. In another example, a metric may be received to not use any sponsored content networks 108 where more than 20% of the sponsored content items have been determined to contain content of a particular nature based on image analysis of captured images of the sponsored content items. Metrics may be applied to data concerning the sponsored content items and associated sponsored content networks 108 such as flagging of items, categories of sponsored content items based on image analysis, undesirable elements in displayed text or images of the sponsored content items regardless of category, sponsored content IDs categories of sponsored content items, categories of sponsored content networks 108, revenue of sponsored content network 108, click through rate of sponsored content network 108, conversion rate of sponsored content network 108, and the like.

The metric is applied to the sponsored content network list associated with the publisher using the user interface at 306. In some arrangements, a sponsored content network list is immediately updated and sent to the publisher computing system 102 associated with the publisher as part of the mediation code for future inclusion with publisher content. In other arrangements, the sponsored content network list is periodically updated on a schedule. In some arrangements, the updated mediation code is sent directly to user devices 104.

C. Implementations of User Interfaces

Referring now to FIG. 4, one screen 400 of a user interface provided to a publisher to review recent sponsored content item is depicted according to an implementation. The screen allows a user associated with a publisher to review a list 404 of recent sponsored content items that have been displayed along with publisher content of the publisher on user devices 104. A pull down menu 402 allows the list to be ordered using different criteria. As depicted, the list is ordered by date. Other options for the pull down menu may include ordering by an ID of the sponsored content item, the number of impressions of the sponsored content item that have been shown, an ID or descriptive identifier of the sponsored content network 108 that served the sponsored content item, the category (or categories) associated with the sponsored content item after image analysis has been performed, a flagged status by a user of a user device 104 that has displayed the sponsored content item, and the like. The date may be displayed in further detail to include a time stamp. In some arrangements, additional information for flagged sponsored content items may be provided such as number of times flagged, number of unique user devices that have flagged the sponsored content item, frequency of flagging, and other statistics associated with flagging of the sponsored content items. In some arrangements, other information may be available on demographics of the users of the user devices 104 that have flagged the sponsored content item.

Figure 5:
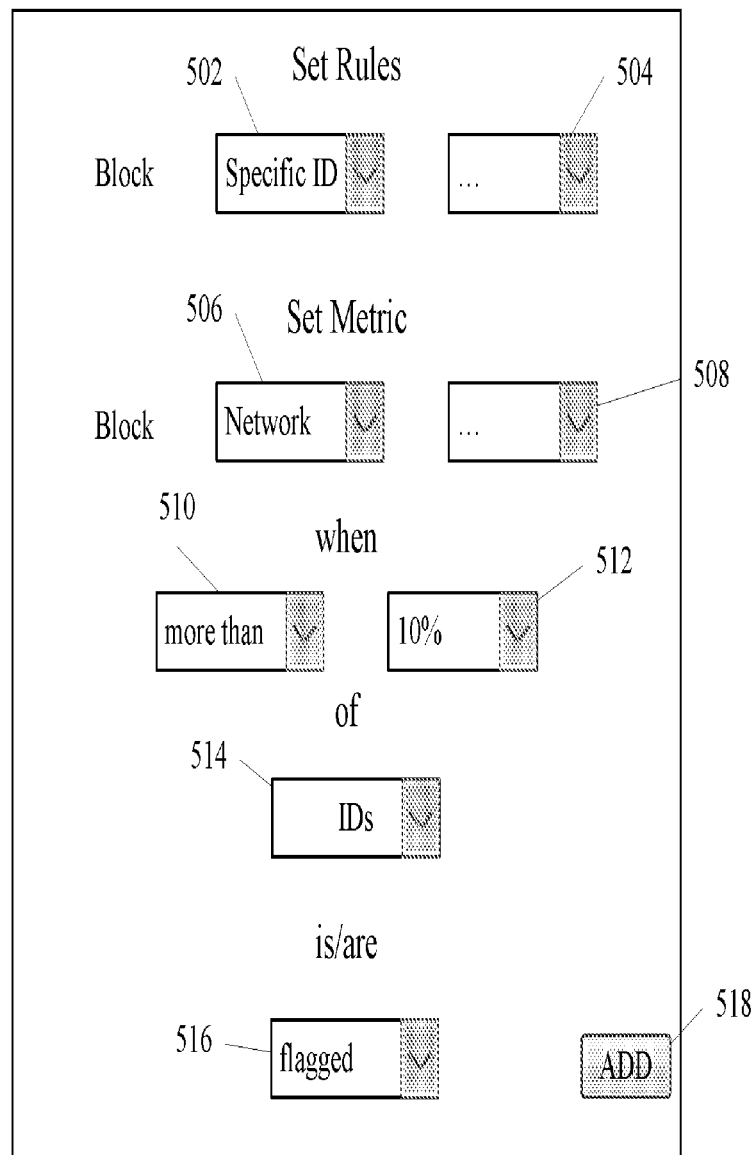
FIG. 5 depicts an implementation of a screen of a user interface provided to a publisher to set rules and metrics concerning sponsored content networks.

Referring now to FIG. 5, one screen 500 of a user interface provided to a publisher to set rules and metrics concerning sponsored content networks is depicted according to an implementation. The screen allows a user associated with a publisher to set the rules and metrics concerning sponsored content networks 108. For example, pull down menu 502 may be used to implement a rule concerning a particular sponsored content item or sponsored content network 108. Pull down menu 502 may be used to select the option of blocking a specific ID of a sponsored content network 108. Then pull down menu 504 can be used to select from the available IDs to block. Other available options in pull down menu 502 may be the ID of a specific sponsored content item, a category of sponsored content items, a category of sponsored content networks 108 and the like. In some arrangements, it may be possible to block a particular sponsored content item 108 without blocking the entire sponsored content. Metrics may also be set starting with pull down menu 506. Various options may be available for pull down menu 506 including sponsored content IDs categories of sponsored content items, categories of sponsored content networks 108, revenue of sponsored content network 108, click through rate of sponsored content network 108, conversion rate of sponsored content network 108, and the like. Once a selection is made in pull down menu 506, the selection of items available for the selection is made available under pull down menu 508. For example, if 'Network' is chosen under pull down menu 506, a list of available sponsored content network IDs may be chosen with pull down menu 508.

The parameters for when the metric should be implemented to block a sponsored content item or sponsored content network 108 is determined with pull down menu 510, pull down menu 512 and pull down menu 514 in this implementation. Pull down menu 510 allows for the selection of comparison options such as 'more than', 'less than', 'equal to', and the like. Pull down menu 512 allows for the selection of numerical values such as percentages and/or numerical values depending on the selection made in pull down menu 510. Pull down menu 514 allows for the selection of the element being compared such as sponsored content item IDs. Other options for pull menu 514 may be 'sponsored content item impressions', 'sponsored content item click-through rate', 'revenue', and the like. Pull down menu 516 allows for the selection of the criteria for the element being compared such as 'flagged' for sponsored content items served by a sponsored content network 108. Other options for pull down menu 516 may be 'categorized as nudity', 'provided by the sponsored content network', and the like. A button 518 is provided to add the rule or metric to the rules and metrics currently being applied. More than one metric may be added to refine the filters. For example, a sponsored content network 108 may be blocked if more than 2% of sponsored content items served by the network have been flagged or blocked if the sponsored content network 108 starts providing less than 5% of total revenue out of all the available sponsored content networks 108. In some arrangements, the order the metrics have been added may determine priority. For example, a sponsored content network 108 may be blocked if more than 5% of sponsored content items served have been flagged, but only if the sponsored content network 108 is also providing less than 20% of total revenue.

In one example use case, a mobile game may be provided by the publisher, where the mobile game includes in-application sponsored content items such as advertisements. The publisher notices reviews of the mobile game complaining about the advertisements being shown in the game not being age appropriate. An agent of the publisher logs on using the user interface and views images of the advertisements being sent to the mobile game, views which sponsored content items have been flagged in the mobile game and blocks the sponsored content network 108 associated with the flagged content items. In a similar use case, no sponsored content items have been flagged, but the agent of the publisher audits all the sponsored content items shown within a time frame and blocks the sponsored content network 108 that appears to be the source of the bad reviews. In another example, instead of blocking a particular sponsored content network 108, the publisher determines that nudity on sponsored content items seems to be the main source of flagged items and sets a metric to automatically block any sponsored content networks 108 where an image analysis of the sponsored content items determines that more than 5% of the served sponsored content items from that sponsored content network contain nudity or curse words.

D. Network and Computing Environment

Figure 6:
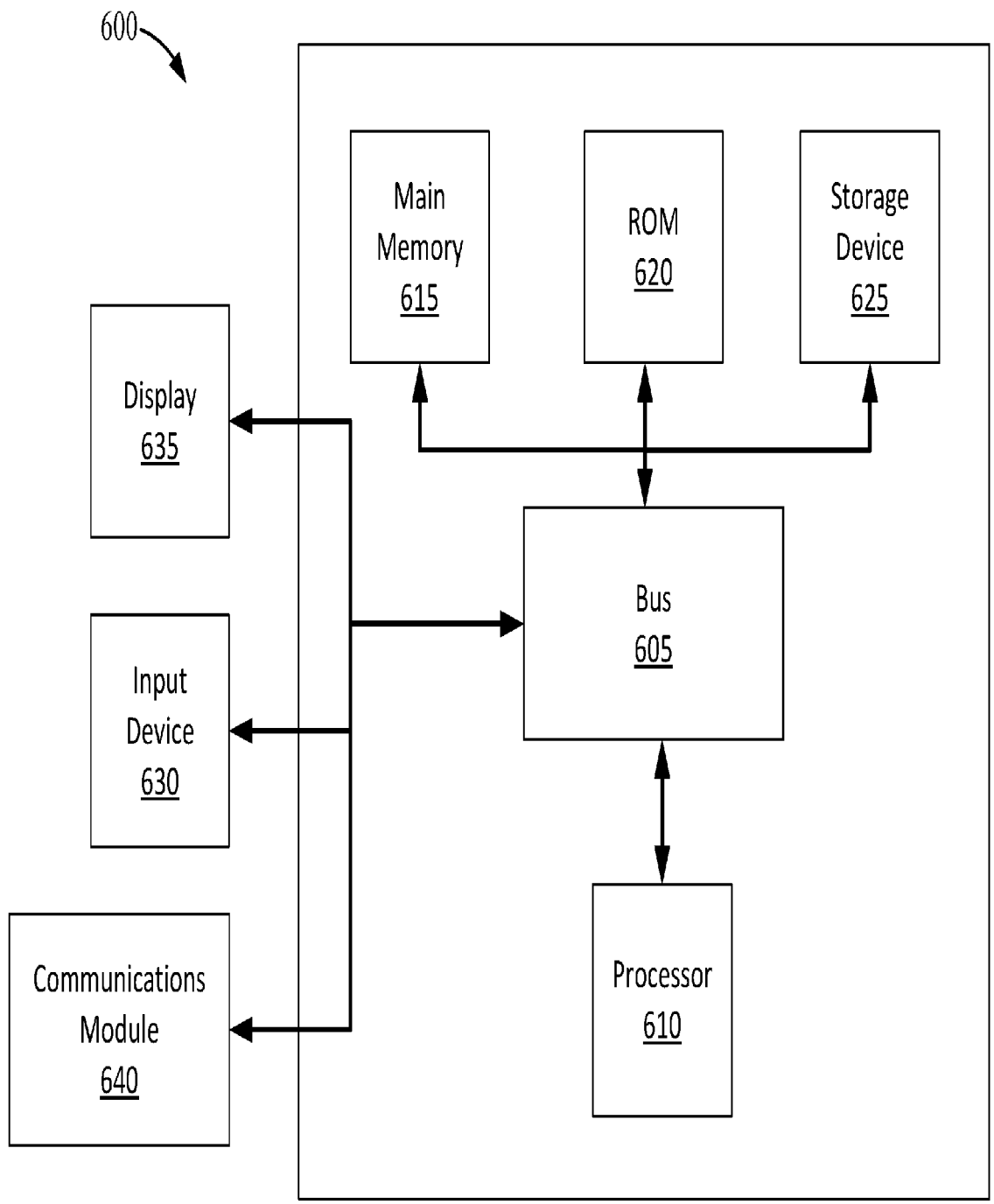
FIG. 6 is a block diagram depicting a general architecture for a computer system that may be employed to implement various elements of the systems and methods described and illustrated herein.

FIG. 6 is a block diagram of a computer system 600 that can be used to implement the publisher computing systems 102, the user devices 104, the mediation computing system 106, the sponsored content networks 108 and/or any other computing device described herein. The computing system 600 includes a bus 605 or other communication component for communicating information and a processor 610 or processing module coupled to the bus 605 for processing information. The computing system 600 also includes a main memory 615, such as a RAM or other dynamic storage device, coupled to the bus 605 for storing information, and instructions to be executed by the processor 610. The main memory 615 can also be used for storing position information, temporary variables, or other intermediate information during execution of instructions by the processor 610. The computing system 600 may further include a ROM 620 or other static storage device coupled to the bus 605 for storing static information and instructions for the processor 610. A storage device 625, such as a solid state device, magnetic disk or optical disk, is coupled to the bus 605 for persistently storing information and instructions. The computing device 600 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 600 may be coupled via the bus 605 to a display 635, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 630, such as a keyboard including alphanumeric and other keys, may be coupled to the bus 605 for communicating information and command selections to the processor 610. In another implementation, the input device 630 may be integrated with the display 635, such as in a touch screen display. The input device 630 can include a cursor control, such as a mouse, a trackball, or cursor direction keys, for communicating direction information and command selections to the processor 610 and for controlling cursor movement on the display 635.

According to various implementations, the processes and/or methods described herein can be implemented by the computing system 600 in response to the processor 610 executing an arrangement of instructions contained in the main memory 615. Such instructions can be read into the main memory 615 from another computer-readable medium, such as the storage device 625. Execution of the arrangement of instructions contained in the main memory 615 causes the computing system 600 to perform the illustrative processes and/or method steps described herein. One or more processors in a multi-processing arrangement may also be employed to execute the instructions contained in the main memory 615. In alternative implementations, hard-wired circuitry may be used in place of or in combination with software instructions to effect illustrative implementations. Thus, implementations are not limited to any specific combination of hardware circuitry and software.

The computing system 600 also includes a communications module 640 that may be coupled to the bus 605 for providing a communication link between the system 600 and the network 110. As such, the communications module 640 enables the processor 610 to communicate, wired or wirelessly, with other electronic systems coupled to the network 110. For instance, the communications module 640 may be coupled to an Ethernet line that connects the system 600 to the Internet or another network 110. In other implementations, the communications module 640 may be coupled to an antenna (not shown) and provides functionality to transmit and receive information over a wireless communication interface with the network 110.

In various implementations, the communications module 640 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZIGBEE, IEEE 802.15.4-2003), Infrared protocols, BLUETOOTH protocols, EMI protocols including passive or active RFID protocols, and/or the like.

The communications module 640 may include one or more transceivers configured to communicate using different types of communication protocols, communication ranges, operating power requirements, RF sub-bands, information types (e.g., voice or data), use scenarios, applications, and/or the like. In various implementations, the communications module 640 may comprise one or more transceivers configured to support communication with local devices using any number or combination of communication standards. In various implementations, the communication module 640 can also exchange voice and data signals with devices using any number of standard communication protocols.

Although an example computing system 600 has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method to facilitate content mediation selection, comprising:
   receiving, by a user device comprising a memory and one or more processors, content from a publisher server, the content including mediation code, the mediation code including instructions executable by the one or more processors of the user device;
   executing, by the user device, responsive to displaying the content received from the publisher server, the instructions included in the mediation code;
   determining, by the user device, using the mediation code, a content network from which to request a content item, the content network associated with a content network identifier;
   transmitting, by the user device, using the mediation code, a request for a content item from the content network;
   receiving, by the user device, using the mediation code, from the content network, the content item requested from the content item network;
   flagging, by the user device, using the mediation code, the content item, wherein the flagging includes providing a user interface for the user device to receive a flagging reason from a user associated with the user device;
   responsive to the flagging, capturing, by the user device, using the mediation code, an image of the content item;
   sampling, by the user device, the image to select a portion of the image of the content item, the portion of the image including the content item; and
   transmitting, by the user device, using the mediation code, the portion of the image of the content item, the flagging reason, and the content network identifier to a content mediation platform server.

2. The method of claim 1, wherein receiving content from a publisher further comprises receiving a document based on at least one of XHMTL or HTML, and wherein the mediation code is embedded in the received document.

3. The method of claim 1, wherein executing the instructions included in the mediation code is responsive to a request transmitted from the user device.

4. The method of claim 1, wherein determining the content network further comprises:
   accessing, by the user device, using the mediation code, a list or table including a set of content networks; and
   selecting, by the user device, using the mediation code, from the list or table, the content network from the set of content networks.

5. The method of claim 4, wherein determining the content network further comprises:
   determining, by the user device, using the mediation code, that the user device failed to receive a requested content item from a first content network of the set of content networks; and
   selecting, by the user device, using the mediation code, a second content network from the set of content networks.

6. The method of claim 1, wherein receiving the content item requested from the content item network further comprises:
   determining, by the user device, using the mediation code, the content item received from the content item network meets a rejection criteria;
   transmitting, by the user device, using the mediation code, a second request for a second content item from the content network; and
   receiving, by the user device, using the mediation code, the second content item from the content network.

7. The method of claim 1, wherein receiving the content item requested from the content item network further comprises receiving, by the user device, using the mediation code, the image of the content item.

8. The method of claim 1, wherein capturing the image of the content item received from the content network further comprises capturing, by the user device, using the mediation code, a screen shot of the display of the user device while the user device is displaying the content item.

9. The method of claim 8, wherein sampling the image further comprises:
   sampling, by the user device, using the mediation code, the screen shot of the display of the user device to identify a portion of the screen shot; and
   storing, by the user device, using the mediation code, the portion of the screen shot as the portion of the image of the content item.

10. The method of claim 1, wherein transmitting the portion of the image of the content item and the content network identifier to a content mediation platform server further comprises:
    determining, by the user device, using the mediation code, a time to send the portion of the image based on the processor activity of the user device being below a threshold; and
    transmitting, by the user device, the portion of the image of the content item and the content network identifier at the determined time.

11. A system for content mediation selection, comprising: one or more processors and a memory, the one or more processors configured to:
    receive content from a publisher server, the content including mediation code, the mediation code including instructions executable by the one or more processors of the user device;
    execute, responsive to displaying the content received from the publisher server, the instructions included in the mediation code;
    determine, using the mediation code, a content network from which to request a content item, the content network associated with a content network identifier;
    transmit, using the mediation code, a request for a content item from the content network;
    receive, using the mediation code, from the content network, the content item requested from the content item network;
    flag, using the mediation code, the content item, wherein the flagging includes providing a user interface for the user device to receive a flagging reason from a user associated with the device;
    responsive to the flagging, capture, using the mediation code, an image of the content item;
    sample the image to select a portion of the image of the content item, the portion of the image including the content item; and
    transmit, using the mediation code, the portion of the image of the content item, the flagging reason, and the content network identifier to a content mediation platform server.

12. The system of claim 11, wherein in receiving content from a publisher, the one or more processors are further configured to:
    receive a document based on at least one of XHMTL or HTML, and wherein the mediation code is embedded in the received document.

13. The system of claim 11, wherein the one or more processors are further configured to:
    execute the instructions included in the mediation code in response to a request transmitted from the user device.

14. The system of claim 11, wherein the one or more processors are further configured to:
    access, using the mediation code, a list or table including a set of content networks; and
    select, using the mediation code, from the list or table, the content network from the set of content networks.

15. The system of claim 11, wherein the one or more processors are further configured to:
    determine, using the mediation code, that the user device failed to receive a requested content item from a first content network of the set of content networks; and
    select, using the mediation code, a second content network from the set of content networks.

16. The system of claim 11, wherein the one or more processors are further configured to:
    determine, using the mediation code, the content item received from the content item network meets a rejection criteria;
    transmit, using the mediation code, a second request for a second content item from the content network; and
    receive, using the mediation code, the second content item from the content network.

17. The system of claim 11, wherein in receiving the content item requested from the content item network, the one or more processors are further configured to:
    receive, using the mediation code, the image of the content item.

18. The system of claim 11, wherein in capturing the image of the content item received from the content network includes:
    capturing, using the mediation code, a screen shot of the display of the user device while the user device is displaying the content item.

19. The system of claim 18, wherein sampling the image further comprises:
    sampling, using the mediation code, the screen shot of the display of the user device to identify a portion of the screen shot; and
    storing, using the mediation code, the portion of the screen shot as the portion of the image of the content item.

20. The system of claim 11, wherein transmitting the portion of the image of the content item and the content network identifier further comprises:
    determining, using the mediation code, a time to send the portion of the image based on the processor activity of the user device being below a threshold; and
    transmitting, the portion of the image of the content item and the content network identifier at the determined time.

* * * * *